United States Patent [19]

Tsuda et al.

[11] Patent Number: 4,786,977

[45] Date of Patent: Nov. 22, 1988

[54] LIGHTWEIGHT RECORDING APPARATUS USING OPERATIVE PORTIONS FOR STRUCTURAL SUPPORT

[75] Inventors: Tadayuki Tsuda, Kawasaki; Shigeyoshi Onoda, Yokohama; Morikazu Mizutani, Tokyo; Isao Ikemoto, Kawasaki; Shinji Kanemitsu, Tokyo; Hajime Kitajima, Yokohama, all of Japan

[73] Assignee: Canon Kabushiki Kaisha, Tokyo, Japan

[21] Appl. No.: 38,200

[22] Filed: Apr. 14, 1987

[30] Foreign Application Priority Data

Apr. 17, 1986 [JP] Japan ................................ 61-088608

[51] Int. Cl.[4] ................................................ H04N 1/21

[52] U.S. Cl. ...................................................... 358/296

[58] Field of Search ............... 358/296, 300; 355/3 R, 355/21; 346/160, 160.1

[56] References Cited

U.S. PATENT DOCUMENTS

| | | | |
|---|---|---|---|
| 3,499,374 | 3/1970 | Galster et al. | 355/3 R |
| 3,982,832 | 9/1976 | Bendall et al. | 355/8 |
| 4,432,632 | 2/1984 | Yokota | 355/3 R X |
| 4,483,608 | 11/1984 | Satoh | 395/51 X |

*Primary Examiner*—Clifford C. Shaw
*Attorney, Agent, or Firm*—Fitzpatrick, Cella, Harper & Scinto

[57] ABSTRACT

A recording apparatus which includes a bottom plate constituting a bottom portion of the recording apparatus, a first unit fixed to the bottom plate and contributable to a recording operation of the recording apparatus, a second unit fixed to the bottom plate and contributable to the recording operation, and a third unit which is elongated and is contributable to the recording operation and which is fixed adjacent its one longitudinal end to the first unit and is fixed adjacent its other end to the second unit is arranged in such a manner that the mechanical strength of the whole assembly of the recording apparatus is increased. This is done without requiring additional structural members by having functional parts provide structural support for the apparatus.

21 Claims, 3 Drawing Sheets

LIGHTWEIGHT RECORDING APPARATUS USING OPERATIVE PORTIONS FOR STRUCTURAL SUPPORT

FIELD OF THE INVENTION AND RELATED ART

The present invention relates to a recording apparatus such as an ink jet printer, a laser beam printer and a copying machine, more particularly to a structure for enhancing mechanical strength of such a recording apparatus.

Referring first to FIG. 6 which is a perspective view of a basic structure of a conventional recording apparatus which is shown as a copying machine, a base structure of a conventional apparatus includes a bottom plate 1 and rear and front side plates 24 and 25 which are securedly fixed to the bottom plate 1 by screws or the like. Further, in order to provide sufficient mechanical strength, the front and rear side plates 24 and 25 are reinforced by left and right stays 13, 21 and 22. The bottom plate 1, front and rear side plates 24, 25 and left and right stays 13, 21 and 22 constitute a frame, to which members or elements contributable to recording operation of the recording apparatus. More particularly, to the side plates are mounted a high voltage transformer 3, a high voltage unit 4 and a driving motor 5; and to the bottom plate 1 is mounted an image fixing unit including rollers 9 and image-fixer side plates 7 and 8 which are securedly fixed to the bottom plate 1. Recently, there is an increasing demand for a small size and light weight recording apparatus.

SUMMARY OF THE INVENTION

This invention is achieved, particularly noting that when the reduction of the size and/or the weight of the recording apparatus is considered, the number and weight of the structural members such as the side plates and the stays are not negligible because they become a larger share in the total weight.

Accordingly, the present invention provides a recording apparatus which is smaller in the number and/or weight of parts and still has sufficient mechanical strength.

Features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
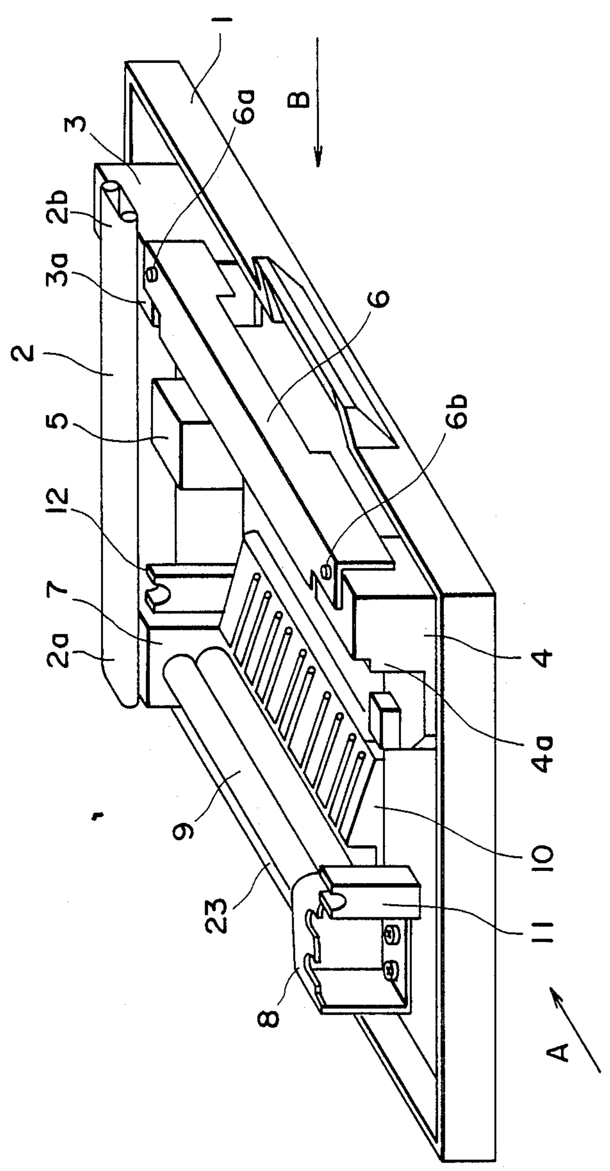
FIG. 1 is a perspective view of a basic structure of a recording apparatus according to an embodiment of the present invention.

Preferred embodiments of the present invention will be described in conjunction with the accompanying drawings, wherein like reference numerals are assigned to like elements.

Figure 2:
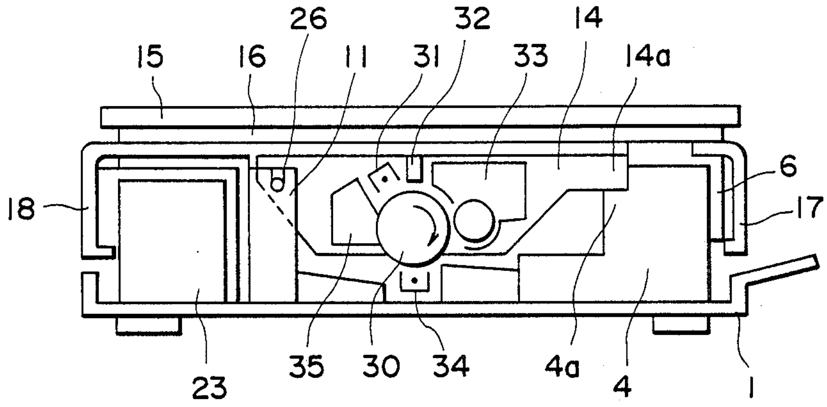
FIG. 2 is a sectional view of the recording apparatus according to the embodiment.

Referring to FIG. 2, there is shown a copying apparatus as a recording apparatus according to an embodiment of the present invention.

The copying apparatus includes a bottom plate which is a molded member, a high voltage unit 4 serving to effect various switching operations and to rectify high voltage provided by a transformer unit 3.

Here, the term "unit" in this specification and claims means a subassembly which can be manufactured or assembled separately but can be incorporated with another subassembly or other subassemblies in the final assembly of a finished recording apparatus and which can perform a particular partial function contributable to the recording operation of the recording apparatus or a subassembly which is separable substantially as a unit from the recording apparatus and which can perform a particular partial function contributable to the recording operation of the recording apparatus. The partial function contributable to the recording operation is, for example, various physical movement, power supply, control, guiding of an original or recording paper, or the like. The "unit" does not include the bottom plate, side plates, stays or the like.

The high voltage unit 4 and the transformer unit 3 are securedly fixed onto the bottom plate 1 by screws or the like. The copying apparatus further includes electric unit 6 accommodating various electronic parts for controlling operation of the copying apparatus, covers 17 and 18 cooperating with the bottom plate 1 to constitute an outer frame, an original carriage 16 for carrying and reciprocating an original to be copied and an original pressing plate 15 which covers the original on the original carriage 16.

A frame 14 is separable from the bottom plate 1 to allow access to the inside of the apparatus for the purpose of the necessary servicing and jam disposal. The frame 14 is correctly positioned by engagement between a positioning pin 26 and recesses of positioning members 11 and 12 which are integrally molded with the bottom plate 1 and by engagement between an end portion **14*a* of the frame 14 and a stepped portion 4*a* of the high voltage unit 4**.

The frame 14 contains an unshown illuminating means for illuminating the original on the original carriage 16, an array 32 of short focus imaging elements for receiving the light from the illuminating means and reflected by the original to form an image of the original, and a photosensitive drum 30 on which the image is formed and a latent image is formed. The photosensitive drum 30 is rotatable in a direction indicated by an arrow also included are a primary charger 31 for uniformly charging the photosensitive drum 30, a developing device 33 for developing a latent image formed on the photosensitive drum 30 and a cleaning device 35 for removing a residual developer remaining on the photosensitive drum 30.

The base structure including the bottom plate 1 supports a transfer charger 34 for transferring a developed image from the photosensitive drum 30 onto a transfer sheet and an image fixing unit 23.

Referring now to FIG. 1, the copying apparatus is shown in a perspective view without the original carriage 16, the frame 14 and the upper covers 17 and 18, that is, they are removed.

As shown in FIG. 1, the bottom plate 1 has a conveying guide for guiding the transfer sheet, which is integrally molded with the bottom plate 1. As best seen in FIG. 1, there is an elongated guiding unit 2 for guiding movement of the original carriage 16. The guiding member is made of a rigid metal, typically iron or the like.

In this embodiment, the guiding unit 2 is fixed adjacent its one end one 2*a* to one of side plates 7 and 8 of the image fixing unit 23. The image fixing unit 23 includes fixing rollers 9 and side plates 7 and 8. The guiding unit 2, adjacent the other end 2*b*, is fixed to a high voltage transformer unit 3, which is fixed to the bottom plate 1 by screws or bonding agent or the like.

In the structure of this embodiment, the mechanical strength of the recording apparatus can be assured by the image fixing unit 23, the guiding unit 2 and the high voltage unit 4, which are contributable to the printing or recording operation of the copying apparatus. As will be understood from FIG. 1, sufficient mechanical strength can be obtained without the side plate 25 which have been necessiated in the prior art shown in FIG. 6.

The electric unit 6 has an elongated shape and covered by metal plates. A part of the metal plates is securedly fixed adjacent at its one end 6*a* to the high voltage transformer unit 3. The other end 6*b* of the electric unit 6 is securedly fixed to the high voltage unit 4.

Thus, similarly to the described above, the mechanical strength of the apparatus can be sufficiently assured by the high voltage transformer unit 3 and the electric unit 6 and the high voltage unit 4. The sufficient mechanical strength can be obtained without the stays 21 and 22 shown in FIG. 6.

It should be appreciatd that the end 2*b* of the guiding unit 2 and the end of the electric unit 6 are fixed to the same member in this embodiment, and therefore, the size of the apparatus is reduced.

Further, in the embodiment, the side plates 7 and 8 of the image fixing unit, the high voltage transformer unit 3 and the high voltage unit 4 are fixed to the bottom plate 1 adjacent the corners of the square bottom plate 1; and the elongated guiding unit 2 and electric unit 6 extend in the respective directions substantrally orthogonal to each other, whereby the mechanical strength in the direction of the original carriage movement and in the direction perpendicular thereto is further assured by the guiding unit 2 and the electric unit 6.

Figure 6:
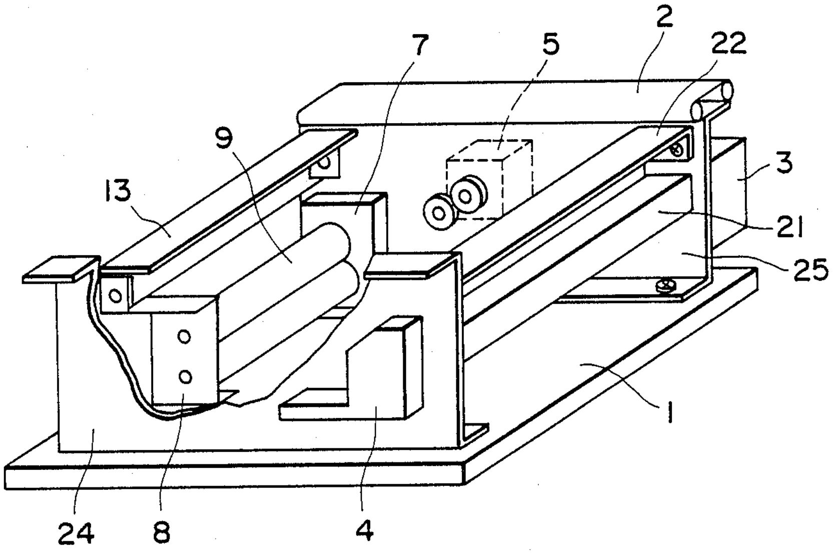
FIG. 6 PRIOR ART
FIG. 6 is a perspective view of a basic structure of a conventional recording apparatus.

The image fixing unit 23 itself is effective to reinforce the apparatus, thus eliminating the necessity of the stay 13 shown in FIG. 6.

Figure 3:
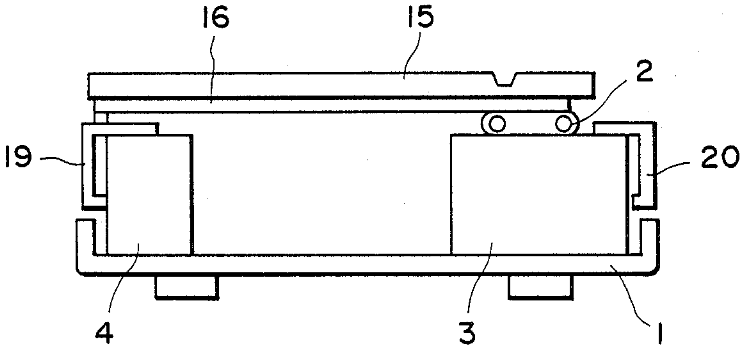
FIG. 3 view of the recording apparatus according to the embodiment.

As shown in FIG. 3, the front side of the apparatus (FIG. 1) is equipped with a front cover 19 securedly fixed to the high voltage unit 4 and the image fixing unit 23, by which the mechanical strength of the front side of the apparatus is provided so that the side plate 24 shown in FIG. 6 can be omitted.

At the rear side of the apparatus, a rear cover 20 is fixed to the high voltage transformer unit 3 and the image fixing unit 23, thus providing additional mechanical strength in addition to the guiding unit 2.

In the operation of the recording apparatus, the photosensitive drum 30 is uniformly charged by the primary charger 31. The photosensitive drum 30 is then exposed to image light from the original carried on the original carriage 16 through the imaging element array 32, so that an electrostatic latent image is formed on the photosensitive drum 30. The thus formed latent image is developed by the developing device 33. The image is transferred by the transfer charger 34 onto a transfer sheet which is fed to the photosensitive drum 30 in alignment with the developed image. The transfer sheet now having the transferred image is transported to an image fixing unit 23, where the image on the transfer sheet is fixed into a permanent image. On the other hand, the photosensitive drum 30 is cleaned by the cleaning device 35 after the image has been transferred therefrom, so as to be prepared for the next image forming operation.

Figure 4:
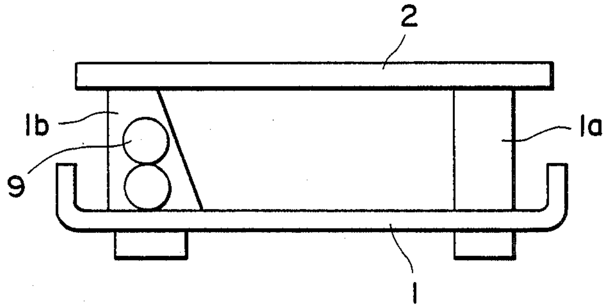
FIG. 4 is a sectional view of a recording apparatus according to another embodiment of the present invention.
Figure 5:
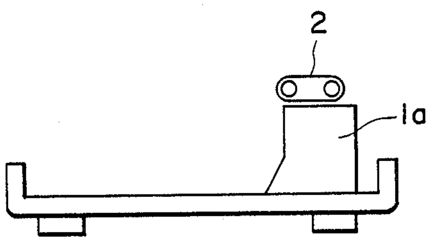
FIG. 5 another sectional view of the recording apparatus according to the embodiment.

Referring to FIGS. 4 and 5, another embodiment of the present invention will be described. FIG. 4 is a sectional view seen in the direction indicated by an arrow A of FIG. 1; and FIG. 5 is a sectional view seen in the direction of an arrow B of FIG. 1.

In this embodiment, the side plates 7 and 8 and a frame of the high voltage transformer 3 which are made of resin material, and are projected from the bottom plate 1 and are integrally molded therewith. The guiding member 2 is fixed to one of the integrally molded side plates 16 and the frame 1*a* of the high voltage transformer 3.

This is further advantageous because the mechanical strength of the apparatus can be obtained by two units, and also because the guiding unit 2 is mounted directly, i.e. not through the side plate or plates, to the bottom plate 1 which is a reference for the positioning, so that the accuracy of the positioning is increased.

As described in the foregoing, according to the present invention, the mechanical strength of the recording apparatus can be increased without increasing 5 the number of parts, and further, the number and/or weight of structural members such as stays 13, 21 and 22 and side plates 24 and 25 can be eliminated or minimized.

The present invention covers any combination of parts of the disclosed embodiments.

While the invention has been described with reference to the structures disclosed herein, it is not confined to the details set forth and this application is intended to cover such modifications or changes as may come within the purposes of the improvemnnts or the scope of the following claims.

What is claimed is:

1. A recording apparatus, comprising:
   - a bottom plate constituting a bottom portion of said recording apparatus;
   - a first unit fixed to said bottom plate and contributable to a recording operation of said recording appartus;
   - a second unit fixed to said bottom plate and contributable to the recording operation; and
   - a third unit which is elongated and is contributable to the recording operation and which is fixed adjacent its one longitudinal end to said first unit and is fixed adjacent its other end to said second unit and wherein said first and second units are fixed to said third unit adjacent corners of said bottom plate.

2. An apparatus according to claim 1, wherein said third unit includes a metal portion connecting the fixed portions.

3. An apparatus according to claim 1, wherein said third unit is an electric unit.

4. A recording apparatus, comprising:

a movable original carriage for carrying an original to be copied;

a guiding unit for guiding movement of said original carriage;

a bottom plate constituting a bottom portion of said recording apparatus;

a first unit fixed to said bottom plate and contributable to a recording operation of said recording apparatus;

a second unit fixed to said bottom plate and contributable to the recording operation;

wherein said guiding unit is fixed adjacent its one end to said first unit and is fixed adjacent its other end to said second unit, and said guiding unit is fixed to said first and second units adjacent corners of the bottom plate.

5. An apparatus according to claim 4, wherein said guiding unit is of metal.

6. An apparatus according to claim 4, wherein said first unit is a high voltage transformer unit.

7. An apparatus according to claim 4, wherein said second unit is an image fixing unit.

8. An apparatus according to claim 4, wherein said first unit is a high voltage transformer unit, and wherein said second unit is an image fixing unit.

9. A recording apparatus, comprising:

a bottom plate constituting a bottom portion of said recording apparatus;

a first unit fixed to said bottom plate and contributable to a recording operation of said recording apparatus;

a second unit fixed to said bottom plate and contributable to the recording operation;

a third unit fixed to said bottom plate and contributable to the recording operation;

a fourth unit contributable to the recording operation, which is elongated and which is fixed adjacent its one longitudinal end to said first unit and is fixed adjacent its other end to said second unit; and a fifth unit contributable to the recording operation which is elongated and which is fixed adjacent its one end to said second unit and is fixed adjacent its other end to said third unit wherein said first unit and said fourth unit, said second unit and said fourth unit, said second unit and said fifth unit, and said third unit and said fifth unit are fixed, respectively, adjacent different corners of said bottom plate, respectively.

10. An apparatus according to claim 9, wherein said elongated fourth and fifth units are extended in directions substantially orthogonal to each other.

11. An apparatus according to claim 10, wherein said second unit and fourth unit are fixed at a position adjacent to a position where said second unit and said fifth unit are fixed together.

12. An apparatus according to claim 9, wherein each of said fourth and fifth units includes metal portion connecting fixed portions.

13. An apparatus according to claim 9, further comprising a movable original carriage for carrying an original to be copied and a guiding unit for guiding movement of the original carriage, the guiding unit constituting said fourth unit.

14. An apparatus according to claim 9, wherein said first unit is an elongated image fixing unit, and wherein said image fixing unit extends parallel to said fifth unit.

15. An apparatus according to claim 14, wherein said fifth unit is an electric unit provided with electrostatic parts for controlling said recording apparatus.

16. A recording apparatus, comprising:

a movable original carriage for supporting an original to be copied;

a bottom plate to which units contributable to a recording operation of said recording apparatus are fixed;

first and second projections projecting from said bottom plate and molded integrally with said bottom plate; and a guiding unit for guiding movement of the movable original carriage, the guiding unit being elongated and being fixed adjacent its one end of said first projection and being fixed adjacent its other end to said second projection, said guiding unit being disposed at an upper portion of the recording apparatus.

17. An apparatus according to claim 16, wherein said guiding unit is in the form of a rail of metal.

18. An apparatus according to claim 16, wherein said first projection constitutes a frame of a high voltage transformer.

19. An apparatus according to claim 16, wherein said second projection constitutes means for supporting rollers of an image fixing means.

20. An apparatus according to claim 16, wherein said first projection constitutes a frame of a high voltage transformer, and said second projection constitutes means for supporting image fixing rollers.

21. An apparatus according to claim 16, wherein said first and second projections are of resin material.

* * * * *

UNITED STATES PATENT AND TRADEMARK OFFICE

CERTIFICATE OF CORRECTION

PATENT NO. : 4,786,977

DATED : November 22, 1988

INVENTOR(S) : Tsuda, et al.

It is certified that error appears in the above-identified patent and that said Letters Patent is hereby corrected as shown below:

On the Title Page,

AT [57] IN THE ABSTRACT

Line 10, "unit" should read --unit,--.

COLUMN 1:

Line 25, "contributable" should read --contribute--.

Line 31, "plate 1. Re-" should read --plate 1. ¶ Re---.

Line 59, "FIG.3 view" should read --FIG.3 is another sectional view--

COLUMN 2:

Line 58, "arrow" should read --arrow.--.

Line 59, "also" should read --Also--.

COLUMN 3

Line 26, "necessiated" should read --necessitated--.

Line 39, "appreciatd" should read --appreciated--.

Line 48, "substantrally" should read --substantially--.

UNITED STATES PATENT AND TRADEMARK OFFICE
CERTIFICATE OF CORRECTION

PATENT NO. : 4,786,977

DATED : November 22, 1988

INVENTOR(S) : Tsuda, et al.

It is certified that error appears in the above-identified patent and that said Letters Patent is hereby corrected as shown below:

COLUMN 4

Line 5, "The image" should read --The developed image--.

Line 22, "which" should be deleted.

Line 26, "side plates 16" should read --side plates 1b--.

Line 36, "5" should be deleted.

Line 46, "improvemnnts" should read --improvements--.

Line 54, "partus;" should read --paratus;--.

COLUMN 6

Line 33, "of" should read --to--.

Signed and Sealed this

Fifth Day of September, 1989

Attest:

DONALD J. QUIGG

Attesting Officer

Commissioner of Patents and Trademarks